(12) United States Patent
Lin et al.

(10) Patent No.: US 7,872,785 B2
(45) Date of Patent: Jan. 18, 2011

(54) SYSTEMS AND METHODS FOR PARAMETERIZED SPOT COLOR RENDERING

(75) Inventors: Guo-Yau Lin, Fairport, NY (US); Zehlam Ramnath, Webster, NY (US); Mike Lacagnina, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 392 days.

(21) Appl. No.: 12/016,353

(22) Filed: Jan. 18, 2008

(65) Prior Publication Data
US 2009/0185201 A1 Jul. 23, 2009

(51) Int. Cl.
G03F 3/08 (2006.01)
G06F 15/00 (2006.01)
G06K 15/00 (2006.01)
G06K 9/00 (2006.01)

(52) U.S. Cl. .................. 358/518; 358/1.9; 358/3.23; 382/167; 382/165

(58) Field of Classification Search .................. 358/1.9, 358/1.6, 3.23, 501, 518, 523, 538, 540; 382/167, 382/162, 164, 165
See application file for complete search history.

(56) References Cited

U.S. PATENT DOCUMENTS

| | | | |
|---|---|---|---|
| 6,459,501 B1 * | 10/2002 | Holmes | 358/1.9 |
| 6,633,666 B2 * | 10/2003 | Gill et al. | 382/162 |
| 6,637,849 B2 | 10/2003 | Maltz | |
| 6,809,839 B1 * | 10/2004 | Earl et al. | 358/1.9 |
| 2002/0057833 A1 * | 5/2002 | Gill et al. | 382/162 |
| 2002/0058193 A1 * | 5/2002 | Tosaka et al. | 430/108.23 |
| 2005/0128484 A1 * | 6/2005 | Rodrigues et al. | 356/402 |
| 2006/0139668 A1 * | 6/2006 | Nishikawa | 358/1.9 |
| 2006/0227347 A1 * | 10/2006 | Allen | 358/1.9 |
| 2006/0290953 A1 * | 12/2006 | Mahy et al. | 358/1.9 |
| 2007/0008560 A1 * | 1/2007 | Eschbach | 358/1.9 |
| 2007/0091350 A1 * | 4/2007 | Aritomi et al. | 358/1.14 |
| 2008/0144054 A1 * | 6/2008 | Van de Capelle et al. | 358/1.9 |

* cited by examiner

*Primary Examiner*—Madeleine A Nguyen
(74) *Attorney, Agent, or Firm*—Oliff & Berridge, PLC

(57) ABSTRACT

Systems and methods are provided to provide image quality particularly with regard to rendering spot color objects in image forming devices. Input spot color objects are assessed based on an object type and one or more parameters associated with the object, to include, but not be limited to, a desired tint value. A plurality of spot color rendering mechanisms are available within the individual system and/or method. A determination is made automatically regarding which of the plurality of color rendering mechanism to be employed to enhance specific image quality based on sensed and/or obtained parameters regarding the object, to include, but not be limited to, type and/or desired tint values.

11 Claims, 3 Drawing Sheets

SYSTEMS AND METHODS FOR PARAMETERIZED SPOT COLOR RENDERING

BACKGROUND

This disclosure is directed to systems and methods for maintaining constant or desired hue across a range of tint variation for images formed in an image forming device.

Color images are commonly represented in image forming systems as a series of discrete separations. Each separation may include a set of color density signals for one color. Each separation includes all those portions of the color image having a particular color. When all of the separations are combined together, they form the full color image. Color density signals define digital gray or contone pixels. Pixels are the individually-colored picture elements. Pixels are associated with color values that vary in magnitude over a range from a minimum value to a maximum value with a number of gradients between, corresponding to a given bit density of the color imaging system. Pixel values are commonly represented by eight bits in a data structure (e.g., frame buffer), providing 256 shades of each color. A color may therefore be considered the combination (or recipe) of multiple color values for each pixel in the area where the color appears in an image, which when viewed together, present the combination color. Usually, image forming signals include four primary color signals, i.e., cyan (C), magenta (M), and yellow (Y), and a black (K) signal. Together, these CMYK signals may be considered the colorant signals in a particular image forming device. Because the use of CMYK is well understood in the art, further explanation regarding its use and function in rendering images need not be articulated here.

Two of the most widely known conventional methods, or "paths," for spot color emulation, and/or spot color rendering, in image forming devices are basically understood as follows. In one method, spot colors can be described in the applicable page description language ("PDL") such as PostScript, or PDF. During raster image processing ("RIP") in the digital front end ("DFE"), spot colors are detected, and a predetermined CMYK recipe for rendering the spot color is retrieved from generally a pre-stored table of values for each corresponding spot color. This approach is referred as the "CMYK Path."

In another method, instead of retrieving predetermined CMYK values directly from a pre-stored table, a device independent target is retrieved in a color space representative of the spot color and converted to a CMYK value for rendering the spot color image.

U.S. Pat. No. 6,637,849 B2 to Maltz, which is commonly assigned, and incorporated by reference herein in its entirety, describes conventional technology for specifying a color in a coordinate system. Maltz teaches that color may be measured in terms of three components which are often referred to as L*, a* and b*, which define parameters by which any color may be specified in the coordinate system. In an L*a*b* system, L* generally corresponds to a lightness-darkness scale value, a* generally corresponds to a red-green scale value, and b* generally corresponds to a yellow-blue scale value. Appropriate L*a*b* values, for emulating spot color, are looked up from a table which differs from the CMYK table in that the L*a*b* values are considered to be reasonably device independent. The L*a*b* values are converted to CMYK values to achieve the final CMYK recipe. This conversion process utilizes a color transformation mechanism in the RIP. This second approach is referred to as the "LAB Path."

The final CMYK recipes may be different based on being obtained from the CMYK Path and the LAB Path. For full tint renderings of a specific spot color, each recipe, regardless of the path by which it was obtained, should render a spot color image that is visually identical, provided other steps involved in obtaining and rendering are or the other of the CMYK recipes are consistent, such as, for example, the image color conversion profile is accurate.

Each of the paths has certain advantages and disadvantages depending on the desired spot color rendering in a given image forming device. For example, the CMYK Path provides accurate solid spot color results and is relatively simple to implement. The difficulty is that CMYK Path systems tend to be less accurate in preserving hues for spot color objects at less than full tint values, e.g., a tint value below 1. As a result, spot color results are difficult to color manage across a spectrum of tint values. Additionally, CMYK systems tend to introduce contours and discontinuities when printing sweeps and images. Conversely, LAB Path systems, principally based on the complex nature of the color space value retrieval and conversion process, are slower than CMYK Path systems, but the LAB Path systems provide better opportunity for precise color (hue) management across a range of tints less than 1.

SUMMARY

In an effort to combine the advantages of the differing spot color image rendering paths described above, while mediating the effects of the attendant disadvantages, it would be advantageous to provide an improved system that provides the faster computation times of a CMYK system, while maintaining an ability to color manage spot color renderings for tint values below one, and to reduce and/or otherwise eliminate discontinuities or contours between renderings via separate methods.

The systems and methods according to this disclosure may combine two different methodologies for obtaining accurate rendering of a spot color based on a type, and desired tint, of an object to be formed as a portion of an output image produced in an image forming device. Spot colors usually refer to special colorants that are used to produce results that cannot be achieved by only using the primary colorants. However, in most color printing systems, such as CMYK systems, special colorants are not used. Instead, spot colors are emulated by mixing specific amounts of each primary color. These particular CMYK combinations or recipes are device dependent, and are usually calibrated offline and then stored in a table.

In various exemplary embodiments, the systems and methods according to this disclosure may combine differing methodologies for calculating a spot color mixture depending on parameters intended to be modified in an output image. Specifically, a spot color image forming system may render spot colors differently according to their object type and/or tint values. For images with a desired tint value less than 1, a final CMYK set of values may be converted from a fixed L*a*b* target, i.e., via an LAB Path. However, for images and/or other objects with tint values of 1, a CMYK set of values may be retrieved from a pre-calibrated table, i.e., via a CMYK Path.

In various exemplary embodiments, systems and methods according to this disclosure may provide a capability for receiving a file or image that contains a plurality of objects to be formed as output images in an image forming device. Each of the objects may be analyzed to determine an object type. Types of objects include, for example, sweep objects, image objects, text element objects, fill objects, or other less common object type. A desired tint for each object, or for some group of the objects may be obtained or otherwise determined. A spot color for the object may be obtained from a choice of processes, or spot color rendering processing paths based on one or more sensed or obtained parameters. Such parameters may include making a determination of a processing path based on the type of object and the desired tint.

In various exemplary embodiments, multiple processes or processing paths for determining spot color values to be rendered may include via a conventional LAB Path and CMYK Path. The choice of path may be made based on the type of object and the desired tint. In various embodiments, the CMYK Path may only be used when the object is not a sweep image, and the desired tint is represented by a tint value that, e.g., equals 1. Otherwise, the LAB Path may be used.

In various exemplary embodiments, a tint calculation may be undertaken. For the purposes of this disclosure, a simple matter by which to discuss tint is as representing an area coverage percentage from zero to 100% ($0 \leq t \leq 1$). It should be understood that conventional tint calculation along a CMYK Path to establish a final tint-adjusted CMYK recipe would mean that the final CMYK values $((CMYK)_t)$ may be represented according to the following formulae:

$$C_t = t \times C_c, M_t = t \times M_c, Y_t = t \times Y_c, \text{ and } K_t = t \times K_c$$

where $C_c$, $M_c$, $Y_c$ and $K_c$ are the calibrated values stored in the static CMYK table for a particular image forming device. The final CMYK recipe in such an instance is considered to be "not color managed."

In a typical LAB Path, the tint calculation is in the device independent color space, for example:

$$L_t = t \times L_c + (1-t) \times L_w \quad (1)$$

$$a_t = t \times a_c + (1-t) \times a_w \quad (2)$$

$$b_t = t \times b_c + (1-t) \times b_w \quad (3)$$

where the $L_c$, $a_c$, and $b_c$ are stored in-gamut spot color values at 100%, and $L_w$, $a_w$ and $b_w$ are white point values, e.g., [100, 0, 0]. $L_t$, $a_t$, $b_t$ are then converted to a final CMYK recipe by utilizing the color transformation mechanism in the RIP. This method is "color managed." In this regard, the visual results of the same tint for the same spot color should be consistent across different image forming devices, assuming no out of gamut issues are present. One can see that the equations (1) (2) and (3) represent a linear combination of $(Lab)_c$ and $(Lab)_w$. More complex non-linear relationships may also be defined.

In various exemplary embodiments, the systems and methods according to this disclosure provide improved spot color object rendering based on an object type and a desired tint value according to those criteria. In various exemplary embodiments, for all tints less than 1, hue preservation, which requires active color management, may be addressed by applying an LAB Path. For images and sweeps, apart from hue preservation, in order to attempt to increase smoothness, an LAB Path may be applied for all tint values, including tints equal to 1.

For fills, text and other objects, since these objects do not generally change color within the object, smoothness is not a concern. Therefore, the CMYK Path may be applied for tint values equal to 1, while the LAB Path may be applied for tint values less than 1. These criteria should remain valid even in situations where more than one separation is involved with spot colors within a desired spot color rendering.

Systems and methods are provided to provide image quality particularly with regard to rendering spot color objects in image forming devices. Input spot color objects are assessed based on an object type and one or more parameters associated with the object, to include, but not be limited to, a desired tint value. A plurality of spot color rendering mechanisms are available within the individual system and/or method. A determination is made automatically regarding which of the plurality of color rendering mechanisms to be employed to enhance specific image quality based on sensed and/or obtained parameters regarding the object, to include, but not be limited to, type and/or desired tint values.

These and other features and advantages of the disclosed systems and method are described in, or apparent from the following detailed description of various exemplary embodiments.

BRIEF DESCRIPTION OF THE DRAWINGS

Various exemplary embodiments of disclosed systems and methods for object and tint oriented spot color rendering will be described, in detail, with reference to the following drawings, wherein.

EMBODIMENTS

Figure 1:
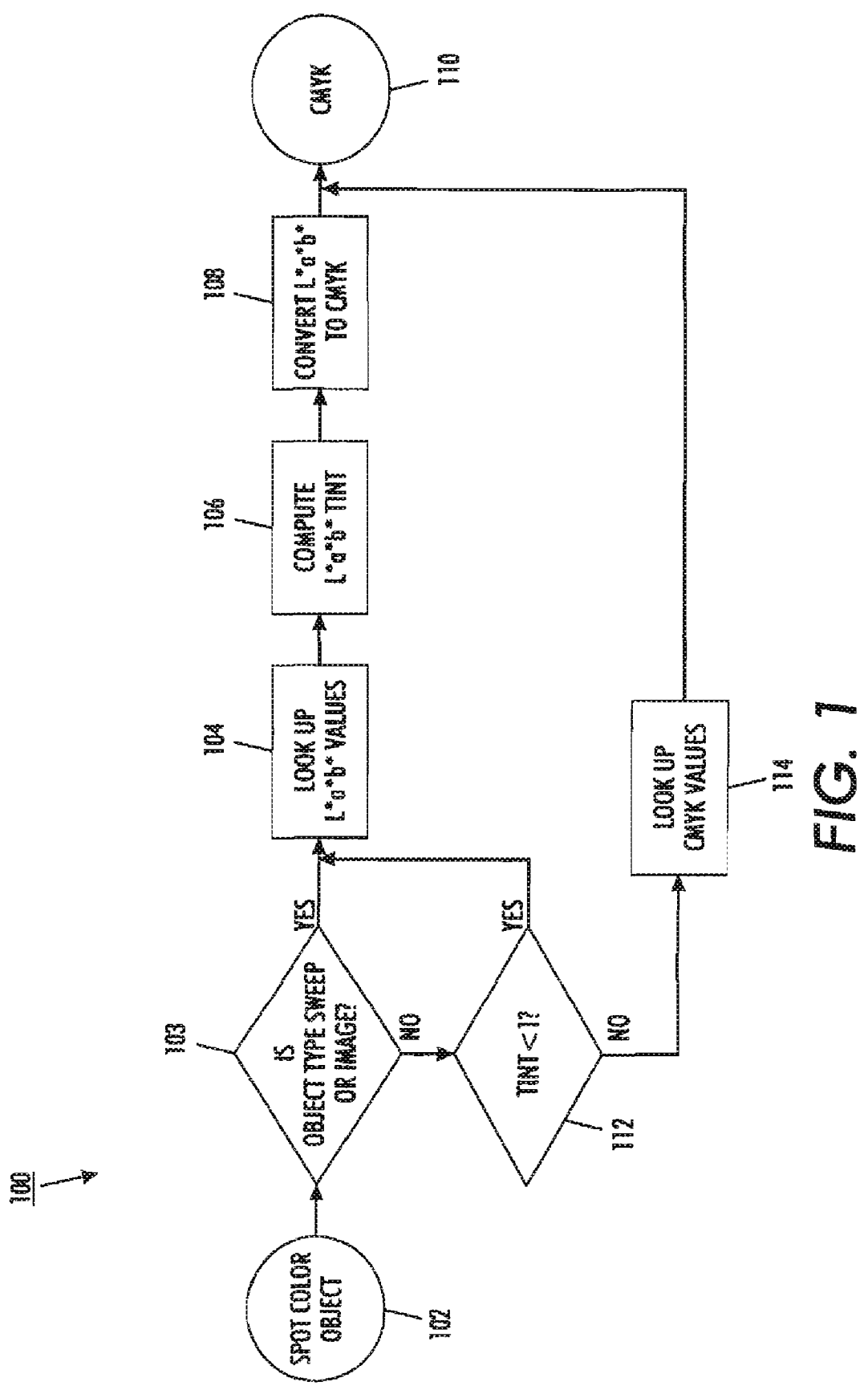
FIG. 1 illustrates a flow chart of an exemplary embodiment of a method for rendering spot color objects according to this disclosure.

The following description of embodiments illustrates examples of systems and methods for modifying image quality in output images, particularly hard-copy output images, based on determining an appropriate method for rendering a spot color, from among a plurality of methods, based on advantages and disadvantages of each of the methods. The following detailed description of various exemplary embodiments of systems and methods for image quality adjustment, and particularly for maintaining a specified hue, or spot object color, across a range of desired or required tint values, may refer to one specific type of image forming device, such as, for example, an electrostatic or xerographic image forming device. The following description may include discussion of various terms relating to image formation, and/or image quality adjustment within such an image forming device, for the sake of clarity, and ease of depiction and/or description. It should be appreciated, however, that although the systems and methods according to this disclosure may be applicable to such a specific application, the depictions and/or descriptions included in this disclosure are not intended to be limited to any specific application, any specific type of image forming device, or any specific image rendering system. It should be understood that any system and/or method for image forming that may advantageously apply the image quality adjustment method and/or spot object color rendering parameters described in this disclosure are contemplated.

In referring to, for example, image forming devices, as this term is to be interpreted in this disclosure, such devices may include, but are not limited to, copiers, printers, scanners, facsimile machines, xerographic image forming devices, multi-function devices ("MFD"). These devices may include one or more of the functionalities normally associated with the above-enumerated individual image forming devices, and/or any other now known or later-developed systems or devices for producing, reproducing and/or potentially transmitting or receiving high quality color images.

The two most common methodologies by which to obtain final CMYK value (recipes) for rendering a spot color include looking up pre-calibrated CMYK values for the particular image forming device involved from a table that is normally stored within the image forming device, or looking up target values specified in a device-independent coordinate system that define a color space and/or gamut for the image forming device. In this latter instance, a common coordinate system may be measured in terms of three components: L* which roughly corresponds to a lightness-darkness scale, a* which roughly corresponds to a red-green scale, and b* which roughly corresponds to a yellow-blue scale. Obtained L*a*b* values are then converted to a CMYK recipe on the fly. The former approach provides accurate solid spot colors but is hard to color manage, particularly with certain type of object renderings and for tint values less than 1. The latter approach provides color management that can generally be accomplished seamlessly but it is difficult to achieve a desired CMYK recipe when tint equals 1.

In various exemplary embodiments, the systems and methods according to this disclosure provide a combination spot color object rendering system that attempts to capitalize on the advantages of each of the above-described methods while mediating the disadvantages associated with those methods.

FIG. 1 illustrates a flow chart of an exemplary embodiment of a method for rendering spot color objects according to this disclosure.

Operation of the method commences at step 102 where a spot color object to be reproduced is obtained. Operation of the method continues to step 103.

In step 103, the type of spot color object is determined. For example, the object type may be defined as one or more of a sweep object, an image object, a text object, or a background object. In this exemplary embodiment, if it is determined in step 103 that the object is, for example, a sweep object or an image object, operation of the method continues to step 104.

If, on the other hand, it is determined that the object is not a sweep object or an image object, operation of the method continues to step 112.

In step 112, a desired tint may be obtained. Such tint may numerically be represented as t, where a desired tint value satisfies the equation $0 \leq t \leq 1$. Such numerical definition of t is intended to represent a range of tint value for the spot color object to be rendered between zero and 100% tint value.

If in step 112, the obtained desired tint value is less than 1, operation of the method continues to step 104.

If, on the other hand, in step 112, it is determined that the desired tint value is not less than 1, i.e., the desired tint value equals 1, operation of the method continues to step 114.

In step 114, for proper objects, with tint values equal to 1, CMYK values will be retrieved from a table of pre-calibrated such values to provide the output CMYK values (recipe) 110 for rendering the output spot color.

If, on the other hand, one of the above conditions is met, as shown in steps S103 and S112, specifically the object is not of a type that is amenable to being reproduced simply from a lookup table of CMYK values, or a desired tint value is less than 1, then a path of the method proceed via step S104.

In step S104, values in a device-independent color space defined as, for example, target L*a*b* value are accessed in, for example, a stored table of such values. Operation of the method continues to step 106. In step 106, a desired tint value, i.e., a tint value less than 1 may be applied to the L*a*b* values recovered from the lookup table according to the following exemplary equations:

$$L_t = t \times L_c + (1-t) \times L_w \qquad (1)$$

$$a_t = t \times a_c + (1-t) \times a_w \qquad (2)$$

$$b_t = t \times b_c + (1-t) \times b_w \qquad (3)$$

A set of non-linear equations may also be applied to achieve the desired hue behavior as a function of t. Operation of the method continues to step 108. In step 108, the tint-modified L*a*b* values are converted to a CMYK recipe by known means to produce an output CMYK recipe 110 for rendering tint-adjusted spot color objects.

Figure 2:
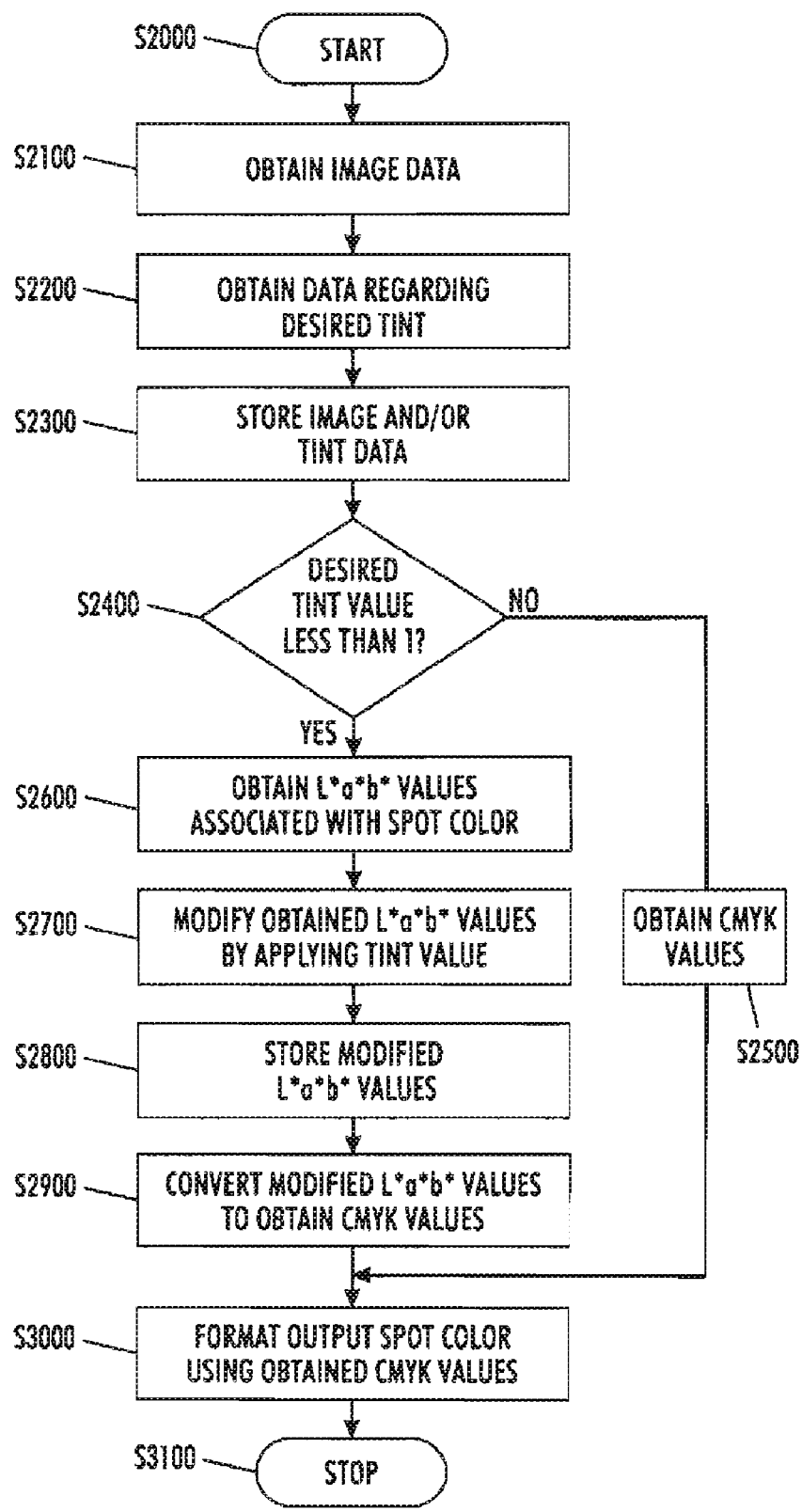
FIG. 2 illustrates a second exemplary embodiment of a method for object and tint oriented spot color rendering according to this disclosure.

FIG. 2 illustrates a second embodiment of a method for object and tint oriented spot color rendering according to this disclosure.

These embodiments employ systems and methods using both the CMYK Path and the LAB Path in combination. As discussed above, in the CMYK Path during the RIP in the DFE, spot color names are detected, and the CMYK recipe is retrieved from the table for each corresponding name. In the LAB Path, the device independent target (e.g., L*a*b*) is retrieved, and the final CMYK recipe is converted from L*a*b* by utilizing the color transformation mechanism in the RIP. The L*a*b* values stored in the table can be obtained by applying the printer model to the CMYK values.

Another aspect of spot colors is tint calculation. When specifying a spot color for an object in the PDL, besides the spot color name, one should also specify the tint value ($0 \leq t \leq 1$), which represents the area coverage percentage for that spot color. In the CMYK Path, the tint calculation for the final CMYK recipe is usually done in the CMYK space, meaning:

$$C_t = t \times C_c, \qquad (4)$$

$$M_t = t \times M_c, \qquad (5)$$

$$Y_t = t \times Y_c, \qquad (6)$$

$$K_t = t \times K_c, \qquad (7)$$

where $[C_c, M_c, Y_c, K_c]$ are the calibrated values stored in the static CMYK table. This method is not color managed.

In the LAB path, the tint calculation is in the device independent color space, for example:

$$L_t = t \times L_c + (1-t) \times L_w, \qquad (1)$$

$$a_t = t \times a_c + (1-t) \times a_w, \qquad (2)$$

$$b_t = t \times b_c + (1-t) \times b_w, \qquad (3)$$

where the $[L_c, a_c, b_c]$ are the stored in-gamut spot color values at 100%, and $[L_w, a_w, b_w]$ are the white point values (e.g., [100,0,0]). $[L_t, a_t, b_t]$ is then converted to the final CMYK recipe by utilizing the color transformation mechanism in the RIP. This method is color managed, meaning the visual results of the same tint for the same spot color will be consistent across different printers (assuming no out of printer gamut issue). However, the CMYK recipe at 100% might not be the same as that from the CMYK path, although they are visually identical.

As a result CMYK path systems are accurate for print jobs where tint=1, and provide fast computation times. However, they cannot color manage for print areas having a tint below one. Because the CMYK path systems cannot color manage, they cannot preserve hue for objects having a tint below one. By, contrast LAB path systems can color manage print areas where tint<1, and provide consistent output and hue on different printers. However, they are far slower than CMYK systems.

Furthermore, where the object being printed is a sweep or an image smoothness becomes an additional concern. If a CMYK path were used, even when tint=1, there might be a contour or discontinuity when the system switched to a LAB path for areas of tint below 1. The contour or discontinuity would be caused because the CMYK values might not gradually change when switching from the CMYK path to the LAB path.

As shown in FIG. 2, operation of the method commences at step S2000 and proceeds to step S2100.

In step S2100, image data is obtained which may include one or more spot color images to be rendered. Operation of the method continues to step S2200.

In step S2200, data is obtained regarding a desired tint. It should be appreciated that such information may be automatically available based on the desired color spot rendering, or may be obtained by any conventional means such as, for example, prompting a user via, for example, a graphic user interface associated with an image forming device to input a desired tint value. Operation of the method proceeds to step S2300.

In step S2300, image data and/or tint data associated with the image data may be optionally stored to any advantageous purpose for which such information may be later accessed. Such non-real time access may promote, for example, repetitive color rendering and association of a specific tint value with an individual spot color to be routinely rendered by the image forming device. Operation of the method continues to step S2400.

Step S2400 is a termination step in which it is determined whether a desired tint value is less than 1.

If, in step S2400, the desired tint value is determined not to be less than 1, i.e. the tint value equals 1, operation of the method continues to step S2500. In step S2500, pre-stored CMYK value, i.e., via a CMYK path for the individual image forming device, are obtained as a recipe for rendering the output spot color according to the input image data including one or more spot colors to be rendered. It should be appreciated that, as depicted in FIG. 2, this path is generally considered to be quicker and more precise for certain classes of objects and for tint values equal to 1. Along this path, operation of the method continues to step S3000.

If, in step S2400, it is determined that the desired tint value is less than 1, operation of the method continues to step S2600.

In step S2600, color space values are obtained from computational components associated with a device-independent color space. Such value may be commonly referred to as, for example, L*a*b* value as discussed above. Operation of the method continues to step S2700.

In step S2700, the obtained color-independent component values are modified by applying tint values to each of the individual component values according to equations such as those shown above. In this manner, tint adjusted device-independent value may be used to ultimately render the spot color, particularly for objects that are not directly amenable to CMYK rendering. Operation of the method continues to step S2800.

In step S2800, modified device-independent component value, as adjusted for a specific desired tint value may be stored for later recall. In such an instance, a new table may be produced, for example, that would associate a given spot color name and specific tint with a modified spot color name in order to streamline reproduction of a combination of such values in a future desired rendering of such a spot color at a specific tint value. Operation of the method continues to step S2900. In step S2900, modified device-independent component values in the device-independent color space are converted to obtain CMYK values for spot rendering in the specific device. Operation of the method continues to step S3000. In step S3000, regardless of the path by which final CMYK values (recipes) have been obtained, the output spot color is formatted using the obtained CMYK values in order to be, for example, produced and/or reproduced on an output image receiving medium. Operation of the method continues to step S3100 where operation of the method ceases.

It should be appreciated that while the above method describe a specific manor by which output CMYK values (recipes) may be obtained given a determination based on a desired tint value, where appropriate, such other parameters as may affect a color spot rendering, other than, for example, tint which may benefit from a determination made based on a desired value of such parameter may be substituted. Further, as shown in FIG. 1, it should be appreciated that there are types of objects to be rendered that may benefit from the device-independent, i.e., color managed, output for spot object rendering according to the above exemplary embodiments.

Figure 3:
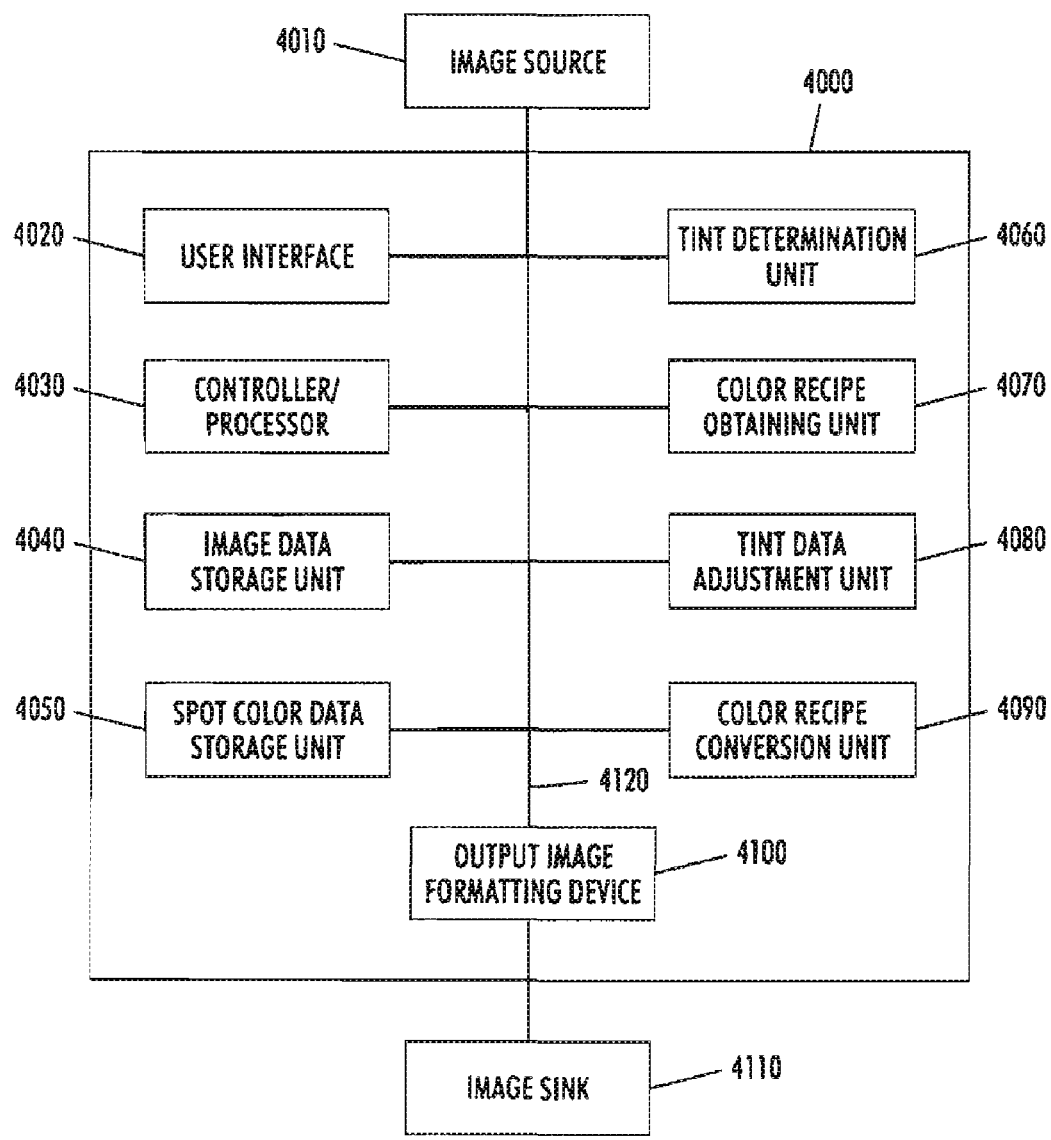
FIG. 3 illustrates a block diagram of a system for object and tint oriented spot color rendering according to this disclosure.

FIG. 3 illustrates a block diagram of a system for object and tint oriented spot color rendering according to this disclosure. As shown in FIG. 3, an image quality adjustment system 4000 may include, or be incorporated in, an image forming device, and/or image forming system. Such an image forming device and/or system may include an image source 4010, a user interface 4020, a controller/processor 4030, an image data storage unit 4040, a spot color data storage unit 4050, a tint determination unit 4060, a color recipe obtaining unit 4070, a tint data adjustment unit 4080, a color recipe conversion unit 4090, an output image formatting device 4100, and/or some manner of image sink 4110, all or individually, interconnected by one or more data/control buses 4120.

In various exemplary embodiments, input images may be obtained via the image source 4010. These input images may be, for example, scanned in any conventions manner. In order that specifically, an input image may be decomposed in order to determine individual spot colors to be rendered. Such input image data from the image source may be temporarily stored in, for example, some manner of image data storage unit 4040, or may be immediately processed via other devices and/or units within the exemplary system.

The image source 4010 is not intended to be limited to any specific type of image source, nor is the image source necessarily an integral component unit of the system 4000. The image source 4010 may be integrated with, or connected remotely to, an exemplary image forming device within which the exemplary system, or components of the exemplary system 4000 may be located.

The user interface 4020 may be provided in the form of, for example, a graphical user interface, associated directly with the exemplary system 4000, or may include such capabilities of a user interface that may be more directly associated with the image forming device and/or system within the exemplary system 4000 may be located. Such user interface 4020 may be particularly usable to query a user, and/or receive a user input, regarding any variable parameter which may, for example, modify a desired spot color rendering of a spot color object within the image forming device. Examples of such parameters include, but are not limited to, desired tint values for the spot color rendering.

It should be appreciated that any manner by which a user may communicate any information with the exemplary system 4000 is intended to be represented by the exemplary user interface 4020.

A controller/processor 4030 may be provided to control overall operation of the system 4000, or otherwise to specifically control individual function relating to adjusting image quality, and particularly object and tint oriented spot color rendering within the system and/or an image forming device and/or system with which the exemplary system 4000 is associated. The controller/processor 4030 may process image data and other monitored parameters received, for example, via one or more of the connected units in making determination automatically, or with some user input via, for example, user interface 4020 within the image forming device that will support highest quality spot color rendering and particularly attempts to maintain consistent hues while modifying other parameters, such as, for example, a desired tint value in the spot color rendering.

Data storage units such as those depicted as an image data storage unit 4040 and a spot color data storage unit 4050 may be provided to store data regarding operating parameters and/or a range of parameter for use within the image forming device. Particularly, it may be advantageous within the image forming device to store look-up tables for pre-determined values of individual component colors such as, for example, CMYK color schemes associated with individual spot color renderings, or otherwise any manner of commonly currently known or later-developed device-independent component parameters by which a color space and/or gamut within an image forming device may be defined. One of the commonly understood color space defining component systems currently in use is the L*a*b* component color system discussed above.

It should be appreciated that although depicted as individual data storage units, the component data storage units shown as 4040 and 4050 in FIG. 3 may be combined as a single data storage unit. Whether individual or combined data storage units, it should also be appreciated that such data storage units may include storage capacity for any manner of processing, control, and/or data information that may be advantageously employed by the exemplary system 4000.

A tint determination unit 4060 may be provided that automatically, or via some user input, determine some tint value to be used in rendering a specific spot color. In general, desired tint values may be defined as t, satisfying the equation $0 \leq t \leq 1$ in order to define a range of tint values between 0 and 100%. It should be further appreciated that, although the systems and methods described in this disclosure focus on tint as the adjustable parameter, other specifically-definable parameters that may affect color spot rendering in an image forming device may also be determined and/or adjusted according to the systems and methods of this disclosure. The exemplary tint determination unit 4060 may determine whether a tint value is, for example, equal to 1 or less than 1 in order to determine which of a plurality of color spot rendering methodologies (paths) may be most advantageously employed within the exemplary system 4000 in order to properly render a specific color spot object.

A color recipe obtaining unit 4070 may be provided to choose between separate methodologies based on a determination made, for example, within the tint determination unit 4060 as to whether a direct access should be made to, for example, a CMYK recipe table that has been pre-determined for a specific image forming device within which the exemplary system 4000 may be housed, or whether a device-independent component system lookup table should be more advantageously accessed in order to obtain individual components defining a device-independent color space in order to render a particular color spot object in the image forming device.

A tint data adjustment unit 4080 may be provided that applies, for example, a desired tint value to individual components of a device-independent color space in order to attempt to enhance a spot color rendering within the image forming device. It should be appreciated that the tint data adjustment unit, as has been discussed and described in this disclosure may only be applicable to modifying values of a color recipe according to one of a plurality of methodologies for color spot rendering in the exemplary system 4000, or an exemplary image forming device within which the exemplary system 4000 may be located.

A color recipe conversion unit 4090 may be provided to convert device-independent parameters defining a tint-adjusted color space to the primary component color by which the image forming device with which the system 4000 is associated may render output images. Such a color recipe conversion unit may convert, for example, tint adjusted L*a*b* values to a CMYK recipe for a specific color spot rendering in the image forming device. It should be appreciated that the above-described direct conversion is a non-limiting example of how such a color recipe conversion unit 4090 may provide conversion between a set of device-independent color space parameters and a primary color system employed by a particular image forming device.

By whatever means an output color recipe may be determined according to one or more modifiable parameters such as, for example, tint, in the image forming device, the primary color recipe for rendering an output spot color, tint-adjusted or otherwise, may be fed to an output image formatting device 4100 that has the capability to format data appropriately to be compatible with an output image sink 4100. It should be appreciated that the functions of, for example, a color recipe obtaining unit 4070, a tint data adjustment unit 4080, and/or a color recipe conversion unit 4090 as described in detail above, may be incorporated into, or otherwise undertaken by the output image formatting device 4100.

An objective of the interaction between the above-described devices, components and/or units is to attempt to accurately render spot color objects across a range of variable parameters such as, for example, tint, in order to deliver to an image sink an accurate spot color rendering across the range of the one or more variable parameters.

The systems and methods according to this disclosure contemplate an image sink that is an output image receiving medium upon which a hard-copy image may be formed. Other image sinks 4100, however, to include for example, additional displays for review of an output image, and/or for evaluation of image quality based on, for example, image quality, and specifically spot color rendering adjustment for objects to be produced and/or reproduced in the image forming device, may be employed.

It should be appreciated that although generally depicted as an integral system 4000 in FIG. 3, each of the devices and/or units (depicted as internal to, or alternatively externally connected to, the exemplary system 4000) may be either units and/or capabilities internal to an image forming device, or individually, or in combination, attached to separate units by any path that facilitates data communication (such as, for example, digital data communication of image data information, and coordination) between such units and/or devices by one or more data/control buses 4120. Such data/control buses, and/or otherwise data communication, may be undertaken by, for example, one or more of a wired, a wireless, an optical, or other like connection, either individually or via some form of network communication between individual devices and/or components and the overall system 4000 supporting spot color rendering in an image forming device.

Any of the data storage units depicted or alternatively described above, may be implemented using an appropriate combination of alterable, volatile or non-volatile memory or non-alterable, or fixed memory, as these terms are currently understood, or reasonably contemplated by those of ordinary skill in the art of image formation, xerographic image formation, and/or image data communication.

It should be appreciated that given the required inputs, to include, but not limited to, appropriate information regarding modifiable parameters and desired spot color renderings in an image forming device, as generally described above, and/or inputs regarding differing capabilities for image quality adjustment particularly with regard to object and tint oriented spot color rendering, in image formation, production and/or reproduction, particularly associated with the systems and methods described above, software algorithms, hardware/firmware circuits, or any combination of software, hardware and/or firmware control elements may be used to implement the individual devices and/or units such as those depicted in, for example, the exemplary system 4000 or the individual units and/or devices in varying combinations as are described in general above.

The computations necessary to establish and/or to determine object spot color rendering in image formation in an image forming device may be implemented within a circuit in the image forming device itself. Alternatively, such computations may be performed on a programmable general purpose, or special purpose computer, program microprocessor or microcontroller, or other like digital signal processing device. These other like digital signal processors may include, but are not limited to, peripheral integrated circuit elements, ASIC, or other integrated circuits, hard-wired electronic or logic circuits, such as, for example, discrete element circuits, programmable logic devices or the like. Individual devices may be manipulated through manual adjustment of one or more operating parameters and/or user-adjustable input parameters that may be associated with one or more of the operating parameters of the exemplary system 4000.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for producing an output image, comprising:
    scanning an input image;
    identifying at least one object in the input image;
    obtaining at least one parameter associated with the identified at least one object,
        wherein the obtaining at least one parameter associated with the identified at least one object comprises determining a spot color for the identified at least one object and a tint value t for the identified at least one, wherein t satisfies the equation $0 \leq t \leq 1$ representing a range of tint values from 0% to 100%;
    selecting one of a plurality of image forming paths based on the obtained at least one parameter, the plurality of image forming paths including at least one device dependent image forming path and at least one device independent image forming path;
    wherein, when t=1, a device dependent look-up table is referenced to obtain a rendering recipe for the identified at least one object, the device dependent look-up table including a recipe of primary colorants for a plurality of spot colors for rendering the object according to the spot color for the identified at least one object,
    wherein, when $t \leq 1$, a set of device independent color space components for defining the spot color is referenced, the set of device independent components is modified by the tint value, and the modified set of device independent components is converted to a recipe of primary colorants for a plurality of spot colors for rendering a tint-adjusted version of the identified at least one object according to the spot color for the identified at least one object, and
    producing an output image including the identified at least one object via the selected one of the plurality of image forming paths.

2. The method of claim 1, the at least one parameter associated with the identified at least one object including a type of the object.

3. The method of claim 1, the at least one parameter associated with the identified at least one object including a spot color for the object.

4. The method of claim 1, wherein the device dependent look-up table includes values for cyan, magenta, yellow and black associated with a plurality of object spot colors.

5. The method of claim 1, the at least one device independent image forming path comprising referencing components in a color space.

6. The method of claim 5, the referenced components in the color space including $L^*$, $a^*$, and $b^*$;
    wherein $L^*$ is a lightness-darkness scale value, $a^*$ is a red-green scale value, and $b^*$ is a yellow-blue scale value.

7. A device that performs the method of claim 1.

8. A xerographic image forming device including a system for performing the method of claim 1.

9. A computer-readable storage medium on which is stored a program for causing a computer to execute the method of claim 1.

10. A method of calculating a spot color mixture, comprising:
    receiving a file to be printed, the file including a plurality of objects;
    determining an object type for at least one object of the plurality of objects, the object type comprising at least one of a sweep, an image, a fill or a text image object type;
    identifying a spot color for rendering the at least one object of the plurality of objects;
    obtaining a tint value of an area to be printed; and
    calculating spot color values for the identified spot color using one of a first process or a second process, wherein a selection of which process to use is based on at least one of the object type or the tint value,
    wherein the first process is selected when the object type is not a sweep or not an image object type and/or the tint value equals 1, and the second process is selected when the object type is the sweep and/or image object type or if the tint value is less than 1,
    wherein the first process calculates the spot color values for the identified spot color by obtaining CMYK values from a predetermined set of CMY-K values, and
    wherein the second process calculates the spot color by looking up $L^*a^*b^*$ values for the identified spot color, modifying the L*a*b* values by the tint value, and converting the modified L*a*b* values to CMYK values, wherein the L* value is a lightness-darkness scale value, the a* value is a red-green scale value, and the b* value is a yellow-blue scale value.

11. An apparatus for printing a spot color object, comprising:

an input unit for inputting a spot color object;

a processor for determining an object type for the spot color object, the object type comprising at least one of a sweep, an image, a fill or a text image object type, identifying the spot color of the object, obtaining a tint value to be applied to the object, and calculating spot color values for the spot color using one of a first process or a second process; and an image sink for rendering the spot color object as at least a portion of an output image, wherein selection of which process to use is based on at least one of the object type or the tint value, wherein the first process is selected when the object type is not a sweep or not an image object type and/or the tint value equals 1, and the second process is selected for the sweep and/or image object type or if the tint value is less than 1, wherein the first process calculates the spot color by obtaining CMYK values from a predetermined set of CMYK values, and wherein the second process calculates the spot color by looking up L*a*b* values for the spot color, modifying the L*a*b* values by the tint value, and converting the modified L*a*b* values to CMYK values, the L* value being a lightness-darkness scale value, the a* value being a red-green scale value, and the b* value being a yellow-blue scale value.

* * * * *